United States Patent
Fukumura et al.

(10) Patent No.: US 10,435,581 B2
(45) Date of Patent: Oct. 8, 2019

(54) COATING COMPOSITION, METHOD FOR MANUFACTURING FILM USING THE SAME, AND COATED ARTICLE USING THE SAME

(71) Applicants: Nippon Fusso Co., Ltd., Sakai-shi, Osaka (JP); Du Pont-Mitsui Fluorochemicals Co., Ltd., Chiyoda-ku, Tokyo (JP)

(72) Inventors: Naoki Fukumura, Osaka (JP); Masahiro Takeyama, Shizuoka (JP); Ryo Nakazawa, Shizuoka (JP)

(73) Assignees: NIPPON FUSSO CO., LTD., Sakai-Shi, Osaka (JP); DU PONT-MITSUI FLUOROCHEMICALS CO., LTD., Chiyoda-Ku, Tokyo (JP)

(*) Notice: Subject to any disclaimer, the term of this patent is extended or adjusted under 35 U.S.C. 154(b) by 75 days.

(21) Appl. No.: 15/431,016

(22) Filed: Feb. 13, 2017

(65) Prior Publication Data

US 2017/0152395 A1  Jun. 1, 2017

Related U.S. Application Data

(63) Continuation of application No. 13/635,031, filed as application No. PCT/JP2011/057508 on Mar. 22, 2011, now abandoned.

(30) Foreign Application Priority Data

Mar. 25, 2010 (JP) ................................ 2010-071130
Mar. 25, 2010 (JP) ................................ 2010-071131

(51) Int. Cl.
| | |
|---|---|
| *C08K 5/057* | (2006.01) |
| *C09D 129/10* | (2006.01) |
| *C09D 5/00* | (2006.01) |
| *C09D 127/18* | (2006.01) |
| *C09D 127/12* | (2006.01) |
| *C08K 5/098* | (2006.01) |
| *C09D 5/08* | (2006.01) |
| *C08K 5/00* | (2006.01) |

(52) U.S. Cl.
CPC ............ *C09D 129/10* (2013.01); *C08K 5/057* (2013.01); *C08K 5/098* (2013.01); *C09D 5/002* (2013.01); *C09D 5/08* (2013.01); *C09D 127/12* (2013.01); *C09D 127/18* (2013.01); *C08K 5/0091* (2013.01); *C08K 2201/019* (2013.01); *Y10T 428/24967* (2015.01); *Y10T 428/269* (2015.01)

(58) Field of Classification Search
CPC ............ C08K 2201/019; C08K 5/0091; C09D 127/18; C09D 129/10; C09D 5/08
See application file for complete search history.

(56) References Cited

U.S. PATENT DOCUMENTS

| | | |
|---|---|---|
| 4,139,576 A | 2/1979 | Yoshimura et al. |
| 5,789,083 A | 8/1998 | Thomas |
| 6,599,628 B1 | 7/2003 | Finsterwalder et al. |
| 2005/0153610 A1 | 7/2005 | McCarthy |
| 2007/0026222 A1 | 2/2007 | Hayakawa et al. |

FOREIGN PATENT DOCUMENTS

| | | |
|---|---|---|
| EP | 0 936 848 A1 | 8/1999 |
| EP | 0 936 848 A1 | 7/2005 |
| JP | 53-074532 A | 7/1978 |
| JP | 61-272273 A | 12/1986 |
| JP | 62-64000 A | 9/1994 |
| JP | 6-328619 A | 11/1994 |
| JP | 08-322732 A | 12/1996 |
| JP | 11-029736 A | 2/1999 |
| JP | 2001-219122 A | 8/2001 |
| JP | 2003-53261 A | 2/2003 |
| JP | 2003-183565 A | 7/2003 |
| JP | 2005-212318 A | 8/2005 |
| JP | 2006-192356 A | 7/2006 |
| WO | WO 2004-048489 A1 | 6/2004 |

OTHER PUBLICATIONS

International Search Report dated May 24, 2011 issued in PCT/JP2011/057508.
Extended European Search Report dated Jul. 26, 2013, issued by the European Patent Office in the European Application No. 11759630.4. (6 pages).
Office Action dated Jul. 3, 2014, by the Chinese Patent Office in corresponding Japanese Patent Application No. 201180015543.5. (7 pages).
Office Action dated Jan. 13, 2015 in the corresponding Japanese Patent Application (3 pages).

*Primary Examiner* — Lawrence D Ferguson
(74) *Attorney, Agent, or Firm* — Buchanan, ingersoll & Rooney PC

(57) ABSTRACT

Provided are a chromium-free fluoropolymer-containing primer composition, which can provide a coated article having excellent higher corrosion resistance by forming a fluoropolymer coating film, and a primer layer having sufficient adhesive strength to the fluoropolymer coating film on the surface of a substrate such as metal, glass, ceramic and heat resistant plastics, a method for manufacturing a coating film using the same, and a coated article using the same. The coating composition contains at least one kind of a fluoropolymer component selected from a reactive functional group-containing fluoropolymer, and a fluoropolymer having a melt flow rate (MFR), measured under a load of 5 kg and at 372° C., in accordance with ASTM D1238, of 10 to 100 g/10 minutes, and an organic titanate, wherein content of titanium contained in the organic titanate, relative to the fluoropolymer component, is 1 to 40% by weight.

10 Claims, No Drawings

COATING COMPOSITION, METHOD FOR MANUFACTURING FILM USING THE SAME, AND COATED ARTICLE USING THE SAME

RELATED APPLICATIONS

This application is a Continuation of U.S. patent application Ser. No. 13/635,031, filed Sep. 14, 2012, which is a U.S. National Stage of International Application No. PCT/JP2011/057508, filed on Mar. 22, 2011, and which claims priority to Japanese Application No. 2010-071130 filed on Mar. 25, 2010, and Japanese Application No. 2010-071131 filed on Mar. 25, 2010, the entire contents of which are incorporated herein by reference.

TECHNICAL FIELD

The present invention relates to a coating composition containing a fluoropolymer, a method for manufacturing a film using the same, and a coated article using the same. In more detail, the present invention relates to a coating composition, suitably applicable to a primer layer effective to form a fluoropolymer coated article onto metal, glass, ceramic and plastic, or the like, a method for manufacturing a film using the same, and a coated article using the same.

BACKGROUND ART

Since a fluoropolymer has superior non-stick property, it has wide applications in various application goods which require non-stick property such as frying pan, a bread mold and a rice cooker. Although the fluoropolymer has superior non-stick property originated from surface free energy when compared with other resins, it has, on the other hand, difficulty of adhesion to other substances, and therefore it has a problem that the formation of a fluoropolymer coating film onto a substrate is not easy.

For example, a fluoropolymer such as polytetrafluoroethylene(PTFE), a tetrafluoroethylene-perfluoro(alkyl vinyl ether) copolymer (PFA), tetrafluoroethylene-hexafluoropropylene (FEP) has been used in various applications because of being excellent in various characteristics such as water-repellent and oil-repellent properties, abrasion resistance, anti-fouling property, heat resistance and chemical resistance. However, it is generally expensive and there may be the case where mechanical strength or dimensional stability becomes insufficient. Accordingly, to cover such a disadvantageous point, while utilizing the advantages of the fluoropolymer, various trials have been performed to adhere the fluoropolymer coating film to other substrates such as metal, glass, ceramic and plastic.

When coating the fluoropolymer onto the surface of metal, ceramic, glass and plastic or the like, there has been a widely used method which comprises forming physical roughness on the surface of these substrates by a method of sandblasting, etching or the like, forming a primer layer by coating a primer composition having adhesive property to the surface of the substrate, and then adhering the fluoropolymer, which is a top coat layer, to the substrate through this primer layer. In this method, in adhesion between the substrate surface and the primer layer, anchor effect has been utilized where adhesive strength is enhanced by increasing adhesion area between the primer layer and the substrate surface owing to roughness of the substrate surface (refer to PATENT LITERATURE 1).

As a primer layer, a composition in which a mixture of a phosphoric acid and a chromic acid is added to a fluoropolymer, or a composition in which a polyethersulfone resin (PES), a polyamidimide resin (PAI), a polyimide resin (PI) or a polyphenylene sulfide (PPS), or the like is used as a main component, and a fluoropolymer is added thereto, is well known (refer to PATENT LITERATURE 2, 3, 4 and 5).

In applications where corrosion resistance is required, a fluoropolymer is generally required to have thickness, and therefore in order to increase the thickness, layered coating is necessary, where applying a powder coating material comprising the fluoropolymer and then baking at a temperature higher than melting point of the fluoropolymer are repeated. A primer is required to have heat resistance for enduring baking at high temperature for this long period of time, and maintaining adhesive property with the substrate or the like.

As the primer superior in heat resistant adhesive property, a chromium phosphate-based primer, which has superior resistance to baking at high temperature for a long period of time, has been used widely. However, with increase in consciousness to an environmental problem, development of a chromium-free primer that does not contain hexa-valent chromium and has strong heat resistant adhesive property comparable to a chromium phosphate-based primer has been strongly required for many years.

As a chromium-free primer, combinations of the fluoropolymer and various binder resins have been investigated. As the binder resin, use of polyphenylene sulfide (PPS) has been proposed, in view of heat resistance. However, PPS is inferior in compatibility with the fluoropolymer, and had a problem of insufficient adhesive property with a fluoropolymer layer.

In order to improve adhesive property with the fluoropolymer layer, as a binder resin in the chromium-free primer, addition of polyamidimide (PAI) and/or polyimide (PI) to PPS has been proposed (refer to PATENT LITERATURE 6 and 8), however, the chromium-free primer of these proposals had still insufficient heat resistant adhesive property.

In addition, there has also been proposed a chromium-free primer of an aqueous dispersed substance having PPS and PAI as a binder resin, which is capable of being applied to a smooth surface (refer to PATENT LITERATURE 7), however, this proposal is characterized by compounding two kinds of fluoropolymers with different melt viscosity in specific weight ratio, and had a problem of deterioration of heat resistant adhesive property, when baked for a long period of time.

Further, there has been proposed a primer coating composition composed of polyamidimide resin (PAI) and a polyphenylene sulfide resin (PPS) in 0.1 to 20% by mass of total amount (refer to PATENT LITERATURE 9), however, also in the primer of this proposal, further improvement of heat resistant adhesive property has been required.

In addition, such a primer layer has been proposed, that has a structure where the first primer layer containing the fluoropolymer and an organic titanate having strong inorganic nature, and the second layer containing the fluoropolymer and polyphenylene sulfide are sequentially layered (refer to PATENT LITERATURE 10).

PRIOR TECHNICAL LITERATURES

Patent Literatures

PATENT LITERATURE 1: JP-A-2001-219122
PATENT LITERATURE 2: JP-A-11-29736

PATENT LITERATURE 3: JP-A-2003-183565
PATENT LITERATURE 4: JP No. 2702041
PATENT LITERATURE 5: JP-A-2003-53261
PATENT LITERATURE 6: JP-A-53-74532
PATENT LITERATURE 7: U.S. Pat. No. 5,789,083
PATENT LITERATURE 8: JP-A-8-322732
PATENT LITERATURE 9: WO2004/048489
PATENT LITERATURE 10: JP No. 4034784

SUMMARY OF THE INVENTION

Problem to be Solved

In the case of using a mixture of chromic acid and phosphoric acid, as in a conventional chromium phosphate-based primer, environmental load is large because of containing a hexa-valent chromium, although there is no problem raised on inferior solvent resistance, high temperature resistance and corrosion resistance. In the case where an organic resin having adhesive property is contained in the primer layer, there was a problem of deterioration of solvent resistance or high temperature resistance and still more corrosion resistance of a primer section, in a structure after adhesion with glass, metal or the like.

The present invention provides a chromium-free fluoropolymer-containing primer composition, which can obtain a coated article having excellent higher corrosion resistance, by providing a fluoropolymer coating film, and a primer layer having sufficient adhesive strength with the fluoropolymer film, on the surface of a substrate such as metal, glass, ceramic and heat resistant plastic.

In addition, it is an object of the present invention to provide a surface modification method using a fluoropolymer that is easy in industrial utilization and has sufficient coating property and adhesive strength, which solves drawbacks observed in a conventional surface modification method using a fluoropolymer.

Means for Solving the Problem

The present inventors have intensively studied a way to solve the above-described problems and discovered the coating composition which does not decrease solvent resistance, high temperature durability and corrosion resistance of the fluoropolymer, while providing furthermore small load to environment, and has adhesive property to metal or the like, and have thus completed the present invention.

That is, the present invention provides a coating composition, which comprises a fluoropolymer having a melt flow rate (MFR), measured under a load of 5 kg and at 372° C., in accordance with ASTM D1238, of 10 to 100 g/10 minutes and an organic titanate, wherein content of titanium contained in the organic titanate, relative to the fluoropolymer component, is 1 to 40% by weight.

A coating composition, wherein the organic titanate is alkoxy titanium, titanium acylate or titanium chelate having a structure comprising a Ti—O—C bond formed by Ti(IV) or Ti(III), and a compound having an alcoholic hydroxyl group, a phenolic hydroxyl group or a carboxyl group, is a preferable embodiment of the present invention.

The coating composition that further contains a reactive functional group-containing fluoropolymer, which is a copolymer of a tetrafluoroethylene/a compound having a reactive functional group/a fluorine-containing comonomer, in a ratio of 0 to 99% by weight, relative to the fluoropolymer, is a preferable embodiment of the present invention.

The coating composition wherein the compound having the reactive functional group is a trifluorovinyl ether group-containing phosphate ester compound is a preferable embodiment of the present invention.

The present invention also provides a method for manufacturing a coated article obtained by applying the coating composition, removing a liquid solvent, and then baking it.

The present invention further provides a coated article, wherein average thickness of the film formed on the substrate is 1 to 300 μm, by the coating film manufacturing method.

In addition, the present invention provides the coated article, wherein the substrate is anyone of metal, ceramic, stainless steel, glass and heat resistant plastic.

Advantageous Effects of Invention

The specific coating composition of the present invention, and the coating film using said coating composition exhibit good adhesive strength to metal, ceramic, glass and heat resistant plastic or the like, in spite of containing the fluoropolymer.

The specific coating composition provided by the present invention does not show the problem of deterioration of solvent resistance, high temperature resistance or wear resistance, because the component that contributes to adhesive property with a substrate such as metal contains an organic titanate having strong inorganic nature.

The coated article provided by the present invention also does not raise a problem of deterioration of solvent resistance or high temperature resistance, as compared with a conventional method in which an organic resin having adhesive property to metal or glass or the like is added.

In addition, it is capable of reducing load to environment, as compared with a conventional coated article which contains a mixture of chromic acid and phosphoric acid in the fluoropolymer.

EMBODIMENTS FOR PRACTICING INVENTION

The present invention provides a coating composition, which comprises at least one kind of a fluoropolymer component selected from a fluoropolymer containing a reactive functional group, and a fluoropolymer having a melt flow rate (MFR), measured under a load of 5 kg and at 372° C., in accordance with ASTM D1238, of 10 to 100 g/10 minutes, and an organic titanate, wherein content of titanium contained in the organic titanate, relative to the fluoropolymer component, is 1 to 40% by weight.

The fluoropolymer used in the present invention is heat-meltable characteristics, and it includes a polymer or a copolymer of unsaturated fluorinated hydrocarbons such as an unsaturated fluorinated hydrocarbon, a fluorinated chlorinated hydrocarbon, an ether group-containing fluorinated hydrocarbon, a dihydrogenphosphate ester group-containing fluorinated hydrocarbon, or a copolymer of these unsaturated fluorinated hydrocarbons and ethylene, or the like.

As examples of the fluoropolymer, there can be cited a polymer of a monomer selected from tetrafluoroethylene, chlorotrifluoroethylene, hexafluoropropylene, fluoroalkoxytrifluoroethylene, vinylidene fluoride and vinyl fluoride; a copolymer of these monomers and ethylene; a copolymer of a trifluorovinyl dihydrogenphosphate ester compound and a fluorine-containing comonomer and the like. They may be used alone or may be used as a mixture of two or more kinds. Melt flow rate (MFR) of the fluoropolymer, measured under a load of 5 kg and at 372° C., in accordance with ASTM D1238, is 10 to 100 g/10 minutes, preferably 10 to 50 g/10 minutes, and more preferably 30 to 40 g/10 minutes. The fluoropolymer having MFR within this range can provide a coating film superior in corrosion resistance and adhesive strength.

As a specific example of the fluoropolymer, there may be exemplified a copolymer of tetrafluoroethylene.fluoroalkoxytrifluoroethylene (hereinafter, PFA); a copolymer of tetrafluoroethylene.hexafluoropropylene(hereinafter, FEP); a copolymer of tetrafluoroethylene.ethylene; a copolymer of tetrafluoroethylene.hexafluoropropylene.perfluoro(alkyl vinyl ether); polychlorotrifluoroethylene; a copolymer of chlorotrifluoroethylene.ethylene; polyvinylidene fluoride, or combinations of two or more kinds thereof. In consideration of film formation property, use of PFA or FEP is preferable.

PFA is a crystalline copolymer of tetrafluoroethylene and fluoroalkoxytrifluoroethylene represented by the following formula (1) or (2), and can be produced by a well-known method such as solution polymerization, emulsion polymerization, suspension polymerization or the like. PFA can be molded by melt-molding process such as melt extrusion molding and injection molding.

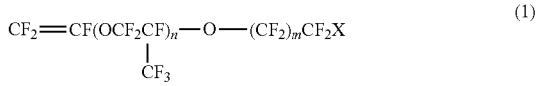

(wherein X represents H or F; n represents an integer of 0 to 4; and m represents an integer of 0 to 7.)

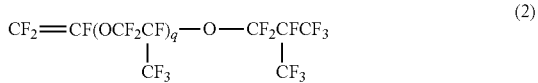

(wherein q represents an integer of 0 to 3.)

As a preferable fluoroalkoxytrifluoroethylene, there can be exemplified a perfluoro(alkylvinylether) such as perfluoro (methylvinylether) (PMVE), perfluoro (ethylvinylether) (PEVE), perfluoro (propylvinylether) (PPVE), perfluoro (isobutylvinylether). Particularly, perfluoro (ethylvinylether) (PEVE) and perfluoro(propylvinylether) (PPVE) are preferable. In addition, content of fluoroalkoxytrifluoroethylene in PFA is preferably 3% by weight or more, and more preferable content is 5% by weight or more, in view of durability. The content in PFA may be selectable as appropriate corresponding to the object of the present invention.

In the present invention, content of the fluoropolymer in the coated article is not especially limited, but it is preferably 60 to 96% by weight, and more preferably 77 to 91% by weight. It is because the content of the fluoropolymer in said film below 60% by weight or over 96% by weight tends not to provide sufficient adhesive property with a substrate.

The reactive functional group-containing fluoropolymer used in the present invention, has heat-meltable characteristics, and it includes a polymer or a copolymer of unsaturated fluorinated hydrocarbons, such as an unsaturated fluorinated hydrocarbon, a fluorinated chlorinated hydrocarbon, an ether group-containing fluorinated hydrocarbon, a dihydrogenphosphate ester group-containing fluorinated hydrocarbon; or a copolymer of these unsaturated fluorinated hydrocarbons and ethylene; and the like, and contains the reactive functional group.

As the reactive functional group, there can be included —COOR (R represents —H, —CH$_3$, —C$_2$H$_5$, —C$_3$H$_7$, —C$_4$H$_9$ or —C$_5$H$_{11}$), —CH$_2$COOR (R represents —H, —CH$_3$, —C$_2$H$_5$, —C$_3$H$_7$, —C$_4$H$_9$ or —C$_5$H$_{11}$), —COF, —CONH$_2$, —CH$_2$OH, —OH, —CN, —CH$_2$O(CO)NH$_2$, —CH$_2$OCN, —CH$_2$OP(O)(OH)$_2$, CH$_2$P(O)Cl$_2$, —SO$_4$H, —SO$_3$H and —SO$_2$F.

In order to obtain such a reactive functional group-containing fluoropolymer, there is a method for copolymerizing a monomer containing the reactive functional group with unsaturated fluorinated hydrocarbons such as an unsaturated fluorinated hydrocarbon, a fluorinated chlorinated hydrocarbon, an ether group-containing fluorinated hydrocarbon, or copolymerizing these with ethylene.

The unsaturated fluorinated hydrocarbons can include a tetrafluoroethylene, a chlorotrifluoroethylene, a hexafluoropropylene, a perfluoro (alkyl vinyl ether), vinylidene fluoride and a vinyl fluoride, and the like.

A preferable example of the monomer having a reactive functional group includes a trifluorovinyl ether group-containing phosphate ester compound. A preferable example of a trifluorovinyl ether group-containing phosphate ester compound is a dihydrogenphosphate ester compound represented by the following formula (1):

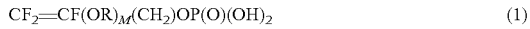

(wherein R represents a perfluoroalkyl group or a perfluoroalkoxy group, having carbon atoms of 1 to 20; and m represents an integer of 1 to 10. When m is 2 or more, R may be the same or different, respectively).

As an example of the preferable reactive functional group-containing fluoropolymer, the reactive functional group-containing fluoropolymer, which is a copolymer of a tetrafluoroethylene/a monomer having a reactive functional group/a fluorine-containing comonomer, may be included. A copolymer, where a monomer having a reactive functional group is a trifluorovinyl ether group-containing phosphate ester compound, is a preferable embodiment of the reactive functional group-containing fluoropolymer of the present invention. As the fluorine-containing comonomer, constituting such a reactive functional group-containing fluoropolymer, perfluoro(alkyl vinyl ether) or perfluoro(alkylvinyl) is suitable. As the perfluoro(alkyl vinyl ether), perfluoro(methyl vinyl ether) (PMVE), perfluoro(ethyl vinyl ether) (PEVE), perfluoro(propyl vinyl ether) (PPVE), perfluoro (isobutyl vinyl ether) or the like can be exemplified. Particularly, perfluoro(ethyl vinyl ether)(PEVE) and perfluoro (propyl vinyl ether)(PPVE) are preferable.

It is desirable that content of monomer unit having a reactive functional group in the copolymer of a tetrafluoroethylene/a monomer having a reactive functional group/a fluorine-containing comonomer is desirably 0.02 to 10% by mole, and more preferably 0.02 to 5% by mole.

In addition, it is desirable that content of the fluorine-containing comonomer is 3 to 15% by mole, and preferably 5 to 12% by mole. As such a reactive functional group-containing fluoropolymer, for example, the one disclosed in JP-A-2005-212318 is included.

In the present invention, content of the reactive functional group-containing fluoropolymer in the coating film is not especially limited, but it is preferably 60 to 96% by weight, and more preferably 77 to 91% by weight. It is because the content of the fluoropolymer in said film below 60% by weight or over 96% by weight tends not to provide sufficient adhesive property with a substrate.

The coating composition in the present invention and the coating film using the composition contain an organic titanate, as a component furnishing adhesive property. In this description, the organic titanate in the present invention is not especially limited, as long as the titanate is soluble into water and stable in water to some extent to secure stability of the coating composition until coating (specifically, titanium lactate or titanium triethanol aminate). In the case of forming the coated article containing the fluoropolymer using an aqueous coating material, however, alkoxy titanium, titanium acylate or titanium chelate having a structure of a Ti—O—C bond formed by Ti(IV) or Ti(III) and the compound having an alcoholic hydroxyl group, a phenolic hydroxyl group, or a carboxyl group is preferable. Among them, in view of solubility into water or stability in water, titanium diisopropoxybis(triethanolaminate) or a similar compound thereof is preferable, and titanium diisopropoxybis(triethanolaminate) coordinated with the one, which is not thermal decomposed even at high temperature (about 300 to 400° C.) and in which an organic residual group remains partially after baking of a primer, is particularly preferable. The organic titanate may be titanium lactate, ammonium titanium lactate, titanium acetylacetonate ammonium lactate and other condensates of diisopropoxy titanium bisacetylacetonate. It should be noted that whether the organic titanate is contained or not in the film can be estimated, for example, by detection of a titanium atom, using X-ray photoelectron spectrometer (XPS), and confirmation of absorption derived from a Ti—O—C bond, using Fourier transform infrared spectrometer (FT-IR).

In the coating film to be formed on a substrate. It is preferable that the organic titanate is contained in the amount so that the ratio of the titanium component in the organic titanate, relative to the fluoropolymer, becomes preferably 1 to 40% by weight, and more preferably 9 to 23% by weight, in view of having good steam resistance, as well as being capable of attaining the coated article with reduced load to environment. It should be noted that the ratio of the titanium component in the organic titanate, relative to the fluoropolymer in this film, can be estimated, for example, by converting the coating film formed on the substrate into ash at temperature or more for thermal decomposition and gasification of the fluoropolymer, and measuring weight of the residual portion.

In the coating composition of the present invention and the coating film using the composition, kind of the fluoropolymer component to be mixed is not especially limited, but when the reactive functional group-containing fluoropolymer, which is the copolymer of a tetrafluoroethylene/a monomer having a reactive functional group/a fluorine-containing comonomer, is further contained in the fluoropolymer, adhesive property with the substrate can be enhanced. It is preferable that such a reactive functional group-containing fluoropolymer is contained in a ratio of 0 to 99% by weight, and preferably 5 to 90% by weight, relative to the fluoropolymer.

In the fluoropolymer having the functional group, mixing way with other fluoropolymer is not especially limited, but a simple blending method or a method for using a polymer having a core/shell structure configured at the outer shell of other fluoropolymer can be used. Among them, in view of handling of the resin, use of a fluoropolymer having a core/shell structure, as described in JP. No. 2882579, is preferable.

It is preferable that the coating composition in the present invention contains a surfactant as needed, in addition to the fluoropolymer and the organic titanate. The surfactant is not especially limited, but it is preferable to be the one, in which a composition to form a coating film is uniformly mixed, layer separation is not occurred until the film has been dried, and many residues are not left after baking.

Content of the surfactant is not especially limited, but it is preferable to be 0.01 to 10% by weight, and more preferable to be 0.5 to 5% by weight. It is because the content of the surfactant below 0.01% by weight tends not to be able to maintain a uniformly mixed state, while the content over 10% by weight tends to leave many carbonized portions in baking, which give adverse influence on film formation property.

In addition, in the coating composition in the present invention, fillers, pigments, pH adjusters, thickeners, conductive materials, heat resistant plastics and the like may further be contained as needed, within a range not to impair effect of the present invention. Fillers, pigments, pH adjusters, conductive materials, heat resistant plastics and the like may be used by being suitably selected from the one which has been used conventionally in the present field, as appropriate, and is not especially limited. In addition, a preparation method of the coating composition of the present invention is not especially limited, and a conventionally known preparation method may be used. For example, the coating composition can be prepared by stirring and mixing the aqueous dispersion of the fluoropolymer and the organic titanate at normal temperature.

A substrate to be used in the present invention is not especially limited, but there can be exemplified metal such as aluminum, iron and stainless steel; glass; ceramic; heat resistant plastic and a clad material of aluminum and stainless steel, or the like.

It is preferable that the film in the present invention is formed in average thickness thereof of is 1 to 300 μm, and more preferably in 5 to 50 μm. It is because this too thin film tends to make difficult to provide uniform adhesive property, while the too thick film tends to raise a problem of bubbling or the like, or increase shrinkage stress of the film itself.

A coated article that is coated with at least two layers obtained by applying the coating film using the coating composition in the present invention as a primer layer, and layering a layer of the fluoropolymer or a layer containing the fluoropolymer thereon to form a top coat layer, is a preferable embodiment of the present invention. The fluoropolymer to be used there includes a similar one as described above. Among them, PTFE, PFA and FEP are preferable. It should be noted that in the present invention, the fluoropolymer contained in the top coat layer and the fluoropolymer contained in the primer layer may be the same or different each other.

Content of the fluoropolymer in the top coat layer is not especially limited, but it is preferably 20 to 100% by weight, and more preferably 30 to 100% by weight. It is because too low content of the fluoropolymer in the top coat layer tends not to provide sufficient adhesive property in interlayer with the primer layers.

An intermediate layer may be formed between the primer layer and the top coat layer. The intermediate layer may be composed of a plurality of layers. As the fluoropolymer contained in the intermediate layer, a similar one as described above as the fluoropolymer contained in the primer layer may be included.

Among them, PTFE, PFA or FEP is preferable. Suitable MFR of the fluoropolymer contained in the intermediate layer is also similar to above-described. It should be noted that, in the present invention, the fluoropolymer contained in the primer layer and the fluoropolymer contained in the intermediate layer may be the same one or may be a different one each other.

Content of the fluoropolymer in the intermediate layer is not especially limited, and in view of obtaining sufficient adhesive strength in interlayer with the primer layers, it is preferably 20 to 98% by weight, and more preferably 30 to 90% by weight.

In view of further furnishing effect to enhance corrosion resistance, in the intermediate layer, it is preferable that a polyphenylene sulfide resin is contained. Content of the polyphenylene sulfide resin is not especially limited, but it is preferably 1 to 50% by weight, and more preferably 5 to 10% by weight. It is because too high content of the polyphenylene sulfide resin tends to decrease solvent resistance or chemical resistance of the fluoropolymer.

It should be noted that in view of enabling to further furnish effect to suppress permeation, it is preferable to contain glass flake. Content of the glass flake is not especially limited, but it is preferably 1 to 30% by weight, and more preferably 5 to 15% by weight.

The intermediate layer may further contain fillers, pigments, pH adjusters, conductive materials and heat resistant plastics and the like as needed, within a range not to inhibit effect of the present invention. Fillers, pigments, pH adjusters, conductive materials and heat resistant plastics and the like may be selected, as appropriate, from those which have conventionally been used in the present field, and are not especially limited.

It is preferable that the intermediate layer is formed in a thickness of 10 to 5000 µm, and more preferably 30 to 1000 µm. It is because the too thin primer layer tends to make formation of the uniform film difficult, while too thick layer tends to decrease adhesive property with the primer layer, due to shrinkage stress of the intermediate layer itself. It should be noted that average thickness of the intermediate layer can be measured similarly as in the primer layer.

The intermediate layer is capable of obtaining high durability, as well as sufficiently securing adhesive property onto a substrate and adhesive property of the fluoropolymer coated thereon, by containing the fluoropolymer and the polyphenylene sulfide resin.

Explanation will be given below on a formation method for the coated article of the present invention. In the present invention, a layer formed on the substrate is called a coating film, and a goods where the coating film is formed on the substrate is called a coated article.

First of all, a composition for forming the film to become the primer layer on the substrate is prepared, which is applied and baked on the substrate to form the primer layer. As the coating composition to form the primer layer, the fluoropolymer and the organic titanate, the surfactant as needed and other components are dispersed in water, and it is applied onto the substrate. The application method is not especially limited, and the application can be performed by a conventionally known method, as appropriate, for example, by a method of spray application, dipping and flow casting or the like. Among them, in view of handling of a coating material, coating of the coating material by the spray application is preferable. In addition, condition of baking (calcination) in formation of the primer layer is not especially limited. For example, condition of baking at a temperature of 150 to 450° C. for 5 to 180 minutes is exemplified. Baking at a temperature of 200 to 300° C. for 5 to 180 minutes is preferable, and baking at a temperature of 250° C. for 5 to 180 minutes is more preferable. Such a baking may be performed by using an electric furnace. It should be noted that such a method may be allowed where after coating the composition to form the primer layer, and before baking, the relevant composition is dried. The drying may be performed under condition as appropriate. These coating, drying and baking, as needed, may be performed multiple times.

Next, a composition for forming the intermediate layer is prepared, which is applied onto the substrate and baked to form the intermediate layer. As the composition to form the intermediate layer, a dispersed solution including the fluoropolymer, the polyphenylene sulfide resin and other components as needed is prepared. As the relevant composition, a commercial product MP-501 (manufactured by Du Pont-Mitsui Fluorochemicals Co., Ltd.) and MP-502 (manufactured by Du Pont-Mitsui Fluorochemicals Co., Ltd.) can also be used suitably. The application method is not especially limited, but it is preferable to apply a coating material by a conventionally known appropriate method such as, for example, an electrostatic coating method, a fluidizing coating. Condition of baking (calcination) in formation of the intermediate layer is also not especially limited. For example, condition of baking at a temperature of 300 to 450° C. for 5 to 180 minutes is exemplified. Such a baking can be performed by using an electric furnace. It should be noted that such a method may be allowed where after applying the composition to form the intermediate layer and before baking, the relevant composition is dried. The drying can be performed under appropriate condition. The method for these applying, optionally drying and baking may be performed several times, and a plurality of the intermediate layers may be formed.

The substrate of the present invention is not especially limited as long as it is endurable to heat in baking, and such a substrate as metal, glass, ceramic and heat resistant plastics or the like which is difficult to adhere with the fluoropolymer can also be used. Among them, metal is particularly suitable. The substrate may be surface-treated by an appropriate way (for example, blast treatment, plating and silane coupling or the like) in advance to enhance adhesive strength with the primer layer.

EXAMPLES

Explanation will be given below in further detail on the present invention with reference to Examples and Comparative Examples, however, the present invention should not be limited to these Examples.

Raw materials and test methods to be used in Examples and Comparative Examples are as follows.

Raw Materials
(A) Fluoropolymer (I)
Tetrafluoroethylene/perfluoro(ethyl vinyl ether) copolymer (PFA), MFR: 30 to 40 g/10 minutes
(B) Fluoropolymer (II)
Tetrafluoroethylene/perfluoro(propyl vinyl ether) copolymer (PFA), MFR: 11 to 18 g/10 minutes
(C) Fluoropolymer (III)
Tetrafluoroethylene/perfluoro(propyl vinyl ether) copolymer (PFA), MFR: 1 to 3 g/10 minutes
(D) Fluoropolymer (IV)
MP-102, manufactured by Du Pont-Mitsui Fluorochemicals Co., Ltd., tetrafluoroethylene/perfluoro(alkyl vinyl ether) copolymer (PFA) powder coating material (E) Fluoropolymer (V)
MP-501, manufactured by Du Pont-Mitsui Fluorochemicals Co., Ltd., tetrafluoroethylene/perfluoro(alkyl vinyl ether) copolymer containing polyphenylene sulfide (PFA) powder coating material
(F) Fluoropolymer (VI)
MP-502, manufactured by Du Pont-Mitsui Fluorochemicals Co., Ltd., filler-containing tetrafluoroethylene/perfluoro (alkyl vinyl ether) copolymer (PFA) powder coating material
(G) Fluoropolymer (VII)
MP-505, manufactured by Du Pont-Mitsui Fluorochemicals Co., Ltd., filler-containing tetrafluoroethylene/perfluoro (alkyl vinyl ether) copolymer (PFA) powder coating material
(H) Fluoropolymer (VIII)
MP-630, manufactured by Du Pont-Mitsui Fluorochemicals Co., Ltd., filler-containing tetrafluoroethylene/perfluoro (alkyl vinyl ether) copolymer (PFA) powder coating material
(I) Reactive Functional Group-Containing Fluoropolymer
Tetrafluoroethylene/perfluoro(ethyl vinyl ether) copolymer/trifluorovinylether group-containing phosphoric acid ester compound copolymer (containing 12% by weight of PEVE and 0.6% by weight of EVE-P), described in Examples of JP-A-2005-212318
(J) Organic Titanate
Orgatics TC-400 (manufactured by Matsumoto Fine Chemicals Co., Ltd.)
Test Methods
(1) Corrosion Resistance
After a test specimen was stood still in steam of 0.8 MPa, at 170° C. for 50 hours, in an autoclave, it was gradually cooled to room temperature. After that, using a 10% by weight normal saline solution, as a reagent, the test specimen was immersed and maintained at 100° C. to observe visually a bulging, generation state of blister (eczema-like bulging), as well as presence or absence of corrosion by each one week till four weeks, and by judging a state that the bulging size is 2 mm or larger; 3 or more blisters are present; and corrosion is confirmed; as an adhesion failure, and it was shown by the time to reach the adhesion failure.
(2) Adhesive Strength
A test specimen for adhesive strength was cut to a layered article formed in a width of 10 mm, and from a masking part (a layered article part of the fluoropolymer not having a primer layer) toward a layered article part of the fluoropolymer having a primer layer, the masking part was peeled, and thus peeled masking part (the layered article part of the fluoropolymer not having a primer layer) was protected by a masking tape.
Measurement of Adhesive Strength:
Using Tensilon universal testing machine (manufactured by A&D Co., Ltd.), in accordance with a measurement method for peeling strength (90 degree peeling strength) of adhesives specified by JIS K6854, the protected part by the masking tape was sandwiched between the chucks of testing machine and pulled in a speed of 50 mm/minute, to measure adhesive strength of the layered article of the fluoropolymer having the primer layer. Unit of the adhesive strength is kgf/cm.
(3) Steam Resistant Adhesive Strength
After a test specimen was stood still in steam of 0.8 MPa, at 170° C. for 100 hours, it was gradually cooled to room temperature to measure adhesive strength by the above method. Unit of the adhesive strength is kgf/cm.

(4) Heat Resistance
After a test specimen was heated at 380° C. for 1 hour, in an electric furnace, it was gradually cooled to room temperature. This procedure was repeated by 11 cycles to measure adhesive strength by the above method. Unit of the adhesive strength is kgf/cm.

Preparation Example 1

Coating compositions (1) to (5) were prepared by mixing an aqueous dispersion of a fluoropolymer, an organic titanate, a thickener and water, which were shown in Table 1. In Table 1, unit of compounding amount of each component is weight parts.

TABLE 1

| | | Coating composition | | | | |
|---|---|---|---|---|---|---|
| | | (1) | (2) | (3) | (4) | (5) |
| Fluoropolymer | (I) MFR: 30 to 40 g/10 min. | 40 | 25 | — | — | — |
| | (II) MFR: 11 to 18 g/10 min. | — | — | 40 | 30 | — |
| | (III) MFR: 1 to 3 g/10 min. | — | — | — | — | 25 |
| Organic titanate | | 60 | 75 | 60 | 70 | 75 |
| Ti amount (wt % vs fluoropolymer) | | 15 | 30 | 15 | 23 | 30 |
| Thickener | | 0.2 | 0.2 | 0.2 | 0.2 | 0.2 |

Example 1

Preparation of a Three-Layered Coated Article:
A substrate using SUS304 was subjected to sandblasting by #60 alumina. After the substrate was subjected to spray coating by the coating composition (1) obtained in the Preparation Example 1, and dried at 120° C. for 10 minutes, it was baked at 250° C. for 60 minutes to form a primer layer having a film thickness of 10 μm.
Next, the fluoropolymer (V) was coated on the primer layer by an electrostatic powder coating, and after baking it at 350° C. for 60 minutes, the fluoropolymer (IV) was further coated thereon and baked at 350° C. for 60 minutes to form an intermediate layer having a thickness of 100 μm.
Finally, the fluoropolymer (IV) was coated by an electrostatic powder coating, and baked at 350° C. for 60 minutes to form a top coating layer having a thickness of 50 μm.
Tests of Corrosion Resistance and Adhesive Strength:
A test specimen was obtained from the obtained coated article having a three-layered film (a three-layered coated article), to perform tests of corrosion resistance and adhesive strength. Results thereof are shown in Table 2.

Example 2

The three-layered coated article was prepared similarly as in Example 1, except for using the coating composition (2) instead of the coating composition (1), to perform the tests of corrosion resistance and adhesive strength. Results thereof are shown in Table 2.

Example 3

The three-layered coated article was prepared similarly as in Example 2, except for changing baking temperature in forming a primer layer, from 250° C. to 350° C., to perform the tests of corrosion resistance and adhesive strength. Results thereof are shown in Table 2.

Example 4

The three-layered coated article was prepared similarly as in Example 1, except for using the coating composition (3) instead of the coating composition (1), and changing baking temperature in forming the primer layer, from 250° C. to 350° C., to perform the tests of corrosion resistance and adhesive strength. Results thereof are shown in Table 2.

Example 5

The three-layered coated article was prepared similarly as in Example 1, except for using the coating composition (4) instead of the coating composition (1), and changing baking temperature in forming the primer layer, from 250° C. to 350° C., to perform the tests of corrosion resistance and adhesive strength. Results thereof are shown in Table 2.

Comparative Example 1

The three-layered coated article was prepared similarly as in Example 1, except for using the coating composition (5) instead of the coating composition (1), to perform the tests of corrosion resistance and adhesive strength. Results thereof are shown in Table 2.

Comparative Example 2

A three layered coated article was prepared similarly as in Example 1, except for using the one, in which a primer 850-7799 (manufactured by E.I.du Pont de Nemours & Co.) using a mixture of chromic acid and phosphoric acid, and 850N-314 (manufactured by E.I.du Pont de Nemours & Co.) were mixed in a ratio of 1:3, as a primer composition, instead of the coating composition (1), to perform tests of corrosion resistance and adhesive strength. Results thereof are shown in Table 2.

TABLE 2

|  |  | Ex. 1 | Ex. 2 | Ex. 3 | Ex. 4 | Ex. 5 | Comp. Ex. 1 | Comp. Ex. 2 |
|---|---|---|---|---|---|---|---|---|
| Test results | Corrosion resistance | 336 | 168 | 168 | 336 | 168 | <168 | 336 |
|  | Adhesive strength | 1.9 | 1.42 | 1.76 | 2.15 | 1.4 | 1.27 | 1.73 |
|  | Steam resistant adhesive strength | 1 | 1.05 | 0.55 | 0.30 | 0.56 | 0.54 | 0.28 |
|  | Heat resistance | >3.5 | >3.5 | — | >3.5 | >3.5 | — | — |

Preparation Example 2

Coating compositions (6) to (10) were prepared by mixing an aqueous dispersion of the fluoropolymer shown in Table 1, (J) reactive functional group-containing fluoropolymer, (K) organic titanate, a thickener and water. In Table 3, unit of compounding amount of each component is weight parts.

TABLE 3

|  | Coating composition | | | | |
|---|---|---|---|---|---|
|  | (6) | (7) | (8) | (9) | (10) |
| Fluoropolymer (I) MFR: 30 to 40 g/10 min. | 32 | 27 | 20 | 13 | — |

TABLE 3-continued

|  | Coating composition | | | | |
|---|---|---|---|---|---|
|  | (6) | (7) | (8) | (9) | (10) |
| Fluoropolymer (II) MFR: 11 to 18 g/10 min. | — | — | — | — | 20 |
| Functional group-containing Fluoropolymer | 8 | 13 | 20 | 27 | 20 |
| Organic titanate | 60 | 60 | 60 | 60 | 60 |
| Thickener | 0.2 | 0.2 | 0.2 | 0.2 | 0.2 |
| Ti amount (wt % vs fluoropolymer) | 15 | 15 | 15 | 15 | 15 |

Example 6

Preparation of a Three-Layered Coated Article:

A substrate using SUS304 was subjected to sandblasting by #60 alumina. After the substrate was subjected to spray coating by the coating composition (7) obtained in the Preparation Example 2, and dried at 120° C. for 10 minutes, it was baked at 250° C. for 60 minutes to form a primer layer having a film thickness of 10 μm.

Next, the fluoropolymer (V) was coated on the primer layer by an electrostatic powder coating, and after baking it at 350° C. for 60 minutes, the fluoropolymer (V) was further coated thereon and baked at 350° C. for 60 minutes to form an intermediate layer having a thickness of 100 μm.

Finally, the fluoropolymer (IV) was coated by an electrostatic powder coating, and baked at 350° C. for 60 minutes to forma top coat layer having a thickness of 50 μm.

Tests of Corrosion Resistance and Adhesive Strength:

A test specimen was obtained from the obtained three-layered coated article, to perform tests of corrosion resistance and adhesive strength. Results thereof are shown in Table 4.

Examples 7 to 10

The three-layered coated article was prepared similarly as in Example 6, except for using the coating composition (6), (8) to (10), respectively, instead of the coating composition (7), to perform the tests of corrosion resistance and adhesive strength. Results thereof are shown in Table 4.

TABLE 4

|  |  | Ex. 6 | Ex. 7 | Ex. 8 | Ex. 9 | Ex. 10 |
|---|---|---|---|---|---|---|
| Test results | Corrosion resistance | >672 | 504 | 168 | 336 | 168 |
|  | Adhesive strength | 2.87 | 2.42 | 1.98 | 2.1 | 2.07 |
|  | Steam resistant adhesive strength | 0.39 | 0.68 | 0.57 | 0.2 | 0.11 |
|  | Heat resistance | >3.5 | >3.5 | — | >3.5 | >3.5 |

Example 11

Preparation of a Three-Layered Coated Article:

A substrate using SUS304 was subjected to sandblasting by #60 alumina. After the substrate was subjected to spray coating by the coating composition (9) obtained in the Preparation Example 2, and dried at 120° C. for 10 minutes, it was baked at 250° C. for 60 minutes to form a primer layer having a film thickness of 10 µm.

Next, Finally, the fluoropolymer (IV) was coated by an electrostatic powder coating, and baked at 350° C. for 60 minutes to form a top coat layer having a thickness of 50 µm.

Tests of Corrosion Resistance and Adhesive Strength:

A test specimen was obtained from the obtained two-layered coated article, to perform tests of corrosion resistance and adhesive strength. Corrosion resistance was evaluated by ratio of defect generation area to test area, on a test specimen after 4 weeks of (1) corrosion resistance test in the above test methods. Results thereof are shown in Table 5.

Examples 12 to 15

The two-layered coated article was prepared similarly as in Example 11, except for using the coating composition (7) obtained in Preparation Example 2, instead of the coating composition (9), and changing the fluoropolymer (IV) used for forming the top coat layer to the fluoropolymers (V) to (VIII), respectively, to perform the tests of corrosion resistance and adhesive strength. Results thereof are shown in Table 5.

Example 16

The two-layered coated article was prepared similarly as in Example 11, except for using the coating composition (7), obtained in Preparation Example 2, instead of the coating composition (9), to perform the tests of corrosion resistance and adhesive strength. Results thereof are shown in Table 5.

Example 17

The two-layered coated article was prepared similarly as in Example 11, except for using the coating composition (6), obtained in Preparation Example 2, instead of the coating composition (9), to perform the tests of corrosion resistance and adhesive strength. Results thereof are shown in Table 5.
Table 5

TABLE 5

| | | Ex. 11 | Ex. 12 | Ex. 13 | Ex. 14 | Ex. 15 | Ex. 16 | Ex. 17 |
|---|---|---|---|---|---|---|---|---|
| Test results | Corrosion resistance (%) | 30 | <10 | <10 | <10 | 10 | <10 | 10 |
| | Adhesive strength | 1.23 | 1.94 | 1.92 | 1.67 | 1.41 | 1.27 | 1.8 |
| | Steam resistant adhesive strength | 0.41 | 0.76 | 0.14 | 0.05 | 0.11 | 0.41 | 0.6 |

Example 18

Preparation of a Two-Layered Coated Article:

A substrate using SUS304 was subjected to sandblasting by #60 alumina. After the substrate was subjected to spray coating by the coating composition (7) obtained in the Preparation Example 2, and dried at 120° C. for 10 minutes, it was baked at 250° C. for 60 minutes to form a primer layer having a film thickness of 10 µm.

Next, the fluoropolymer (VII) was coated on the primer layer by an electrostatic powder coating, and after baking it at 350° C. for 60 minutes, the fluoropolymer (VII) was further coated thereon and baked at 350° C. for 60 minutes to form an intermediate layer having a thickness of 50 µm.

Steam Exposure Test:

The obtained coated article having the two-layered film (two-layered coated article) was subjected to steam exposure at 120° C. for 60 minutes, in an autoclave, to evaluate adhesive strength after exposure by a scratch drawing test (JIS K6894). The evaluation was performed before exposure and after 1 to 5 times of exposure. The evaluation was performed by a method for evaluating in 5 stages of rank 1 (poor) to rank 5 (good), specified in JIS K6894. Results thereof are shown in Table 6.

Comparative Example 3

The two-layered coated article was prepared similarly as in Example 18, except for using the coating composition (5), obtained in Preparation Example 2, instead of the coating composition (7), to perform the steam exposure test. Results thereof are shown in Table 6.

Comparative Example 4

A two-layered coated article was prepared similarly as in Example 18, except in that a primer 850-7799 (manufactured by E.I.du Pont de Nemours & Co.) using a mixture of chromic acid and phosphoric acid, and 850N-321 (manufactured by E.I.du Pont de Nemours & Co.) were mixed in a ratio of 1:3, instead of the coating composition (7), to perform the steam exposure test. Results thereof are shown in Table 6.

TABLE 6

| | | Ex. 18 | Comp. Ex. 3 | Comp. Ex. 4 |
|---|---|---|---|---|
| Steam exposure test | Before exposure | 5 | 5 | 5 |
| | After first exposure | 5 | 3 | 3 |
| | After second exposure | 5 | 3 | 3 |
| | After third exposure | 5 | 3 | 3 |
| | After fourth exposure | 5 | 2 | 3 |
| | After fifth exposure | 5 | 1 | 3 |

Example 19

Preparation of a Coating Composition:

A coating composition was prepared by mixing (J) aqueous dispersion of reactive functional group-containing fluoropolymer, in which a fluoropolymer is contained by 25 parts by weight, 75 parts by weight of (K) organic titanate, and 0.2 part by weight of a thickener. Amount of Ti in the coating composition was 30% by weight, relative to the fluoropolymer.

Preparation of a Three-Layered Coated Article:

A substrate using SUS304 was subjected to sandblasting by #60 alumina. After the substrate was subjected to spray coating by the coating composition obtained in the above, and dried at 120° C. for 10 minutes, it was baked at 250° C. for 60 minutes to forma primer layer having a film thickness of 10 µm.

Next, the fluoropolymer (V) was coated on the primer layer by an electrostatic powder coating, and after baking it at 350° C. for 60 minutes, the fluoropolymer (V) was further coated thereon and baked at 350° C. for 60 minutes to form an intermediate layer having a thickness of 100 µm.

Finally, the fluoropolymer (VI) was coated by an electrostatic powder coating, and baked at 350° C. for 60 minutes to forma top coat layer having a thickness of 50 µm.

Tests of Corrosion Resistance and Adhesive Strength:

A test specimen was obtained from the obtained coated article having a three-layered film (three-layered coated article), to perform tests of corrosion resistance and adhesive strength. Results thereof are shown in Table 1.

Example 20

A coating composition was obtained similarly as in Example 1, except for changing 25 parts by weight of (J) fluoropolymer containing a reactive functional group, to 40 parts by weight, and 75 parts by weight of (K) organic titanate, to 60 parts by weight, in preparation of the coating composition. Amount of Ti in the coating composition was 15% by weight, relative to the fluoropolymer.

A three-layered coated article was prepared similarly as in Example 1, using the obtained coated composition, to perform tests of corrosion resistance and adhesive strength. Results thereof are shown in Table 1.

Comparative Example 5

A three-layered coated article was prepared similarly as in Example 1, except for using a primer composition obtained by mixing a primer 850-7799 (manufactured by E.I.du Pont de Nemours & Co.,) using a mixture of chromic acid and phosphoric acid, and 850N-314 (manufactured by E.I.du Pont de Nemours & Co.,) in a ratio of 1:3, instead of the coating composition, to perform the steam exposure test. Results thereof are shown in Table 1.

TABLE 7

| | | Ex. 19 | Ex. 20 | Comp. Ex. 5 |
|---|---|---|---|---|
| Test results | Corrosion resistance | 168 | 336 | 336 |
| | Adhesive strength | 1.23 | 2.67 | 1.73 |
| | Steam resistant adhesive strength | 0.41 | 0.49 | 0.28 |
| | Heat resistance | >3.5 | >3.5 | — |

Example 21

Preparation of a Coating Composition:

A coating composition was prepared by mixing (J) aqueous dispersion of reactive functional group-containing fluoropolymer, in which a fluoropolymer is contained by 25 parts by weight, 75 parts by weight of (K) organic titanate, and 0.2 part by weight of a thickener. Amount of Ti in the coating composition was 30% by weight, relative to the fluoropolymer.

Preparation of a Two-Layered Coated Article:

A substrate using SUS304 was subjected to sandblasting by #60 alumina. After the substrate was subjected to spray coating by the coating composition obtained in the above, and dried at 120° C. for 10 minutes, it was baked at 250° C. for 60 minutes to forma primer layer having a film thickness of 10 µm.

Next, the fluoropolymer (VI) was coated by an electrostatic powder coating, and baked it at 350° C. for 60 minutes, to form a top coat layer having a thickness of 150 µm.

Tests of Corrosion Resistance and Adhesive Strength:

A test specimen was obtained from the obtained coated article having a two-layered film (two-layered coated article), to perform tests of corrosion resistance and adhesive strength. Corrosion resistance was evaluated by defect generation area to test area. As a result, corrosion resistance was 30%, adhesive strength was 1.294 kg/cm, as peeling adhesive strength, and steam resistance was 0.1 kg/cm, as peeling adhesive strength.

Example 22

Preparation of a Coating Composition:

A coating composition was prepared by mixing (J) aqueous dispersion of reactive functional group-containing fluoropolymer, in which a fluoropolymer is contained by 40 parts by weight, 60 parts by weight of (K) organic titanate, and 0.2 part by weight of a thickener. Amount of Ti in the coating composition was 15% by weight, relative to the fluoropolymer.

Preparation of a Two-Layered Coated Article:

A substrate using SUS304 was subjected to sandblasting by #60 alumina. After the substrate was subjected to spray coating by the coating composition obtained in the above, and dried at 120° C. for 10 minutes, it was baked at 250° C. for 60 minutes to forma primer layer having a film thickness of 10 µm.

Next, the fluoropolymer (VII) was coated on the primer layer by an electrostatic powder coating, and after baking it at 350° C. for 60 minutes, the fluoropolymer (VII) was further coated thereon and baked at 350° C. for 60 minutes to form an intermediate layer having a thickness of 50 µm.

Steam Exposure Test:

The obtained coated article having the two-layered film (two-layered coated article) was subjected to steam exposure at 120° C. for 60 minutes, in an autoclave, to evaluate adhesive strength after exposure by a scratch drawing test (JIS K6894). The evaluation was performed before exposure and after 1 to 5 times of exposure. The evaluation was performed by a method for evaluating in 5 stages of rank 1 (poor) to rank 5 (good), specified in JIS K6894. Results thereof are shown in Table 2.

Comparative Example 6

A three layered coated article was prepared similarly as in Example 22, except for using a primer composition obtained by mixing a primer 850-7799 (manufactured by E.I.du Pont de Nemours & Co.,) using a mixture of chromic acid and phosphoric acid, and 850N-321 (manufactured by E.I.du Pont de Nemours & Co.,) in a ratio of 1:3, instead of the coating composition, to perform tests of corrosion resistance and adhesive strength. Results thereof are shown in Table 2.

TABLE 8

|  |  | Ex. 18 | Comp. Ex. 3 |
|---|---|---|---|
| Steam exposure test | Before exposure | 5 | 5 |
|  | After first exposure | 5 | 3 |
|  | After second exposure | 5 | 3 |
|  | After third exposure | 5 | 3 |
|  | After fourth exposure | 5 | 3 |
|  | After fifth exposure | 5 | 3 |

As described above, it is understood that the coated article obtained by using the fluoropolymer having an MFR of 30 to 40 g/10 minutes, as a primer composition (Example 1) and the coated article obtained by using the fluoropolymer having an MFR of 30 to 40 g/10 minutes and the fluoropolymer containing a functional group, as a primer composition (Example 6) exert more superior performance as compared with the coated article obtained by using a primer which used a mixture of chromic acid and phosphoric acid (Comparative example 2), and further in other Examples, they exert nearly the similar level of performance as the primer which used a mixture of chromic acid and phosphoric acid (Comparative example 2).

In addition, the organic titanate contained in the coating composition of the present invention, when it is used as a water-soluble coating material, is necessary to be stable in water to some extent, or not to give influence on adhesive property even when thermal decomposed. The coating composition containing the organic titanate used in Examples of the present invention had no problem in performance of adhesive property and corrosion resistance, even in using as a one-component type coating material, even after refrigerated storage for 1 year, or standing still at room temperature for 3 months. Accordingly, it can be used sufficiently as the one-component type coating material.

INDUSTRIAL APPLICABILITY

The coating composition and the coated article using the said coating composition, provided by the present invention, exhibit good adhesive strength to metal, ceramic, glass and heat resistant plastics or the like, irrespective of containing the fluoropolymer.

In addition, because of containing the organic titanate having strong inorganic nature, as a component contributing to adhesive property to a substrate such as metal, there is raised also no problem of deterioration of solvent resistance, high temperature resistance or wear resistance.

Further, in the coated film formed by applying a coating film containing the fluoropolymer and the organic titanate as a primer layer to the substrate and layering coating films containing the fluoropolymer on the primer layer sequentially, when the coating film containing the fluoropolymer to be layered contains a polyphenylene sulfide resin, resistance of the primer layer as a whole can be enhanced significantly.

The coated article provided by the present invention also does not raise a problem of deterioration of solvent resistance or high temperature resistance, as compared with a conventional method which uses an organic resin having adhesive property to metal or glass or the like, to the fluoropolymer. In addition, the coated article provided by the present invention enables to reduce load to environment, as compared with a conventional coated article which contains a mixture of chromic acid and phosphoric acid in the fluoropolymer.

The invention claimed is:

1. A coating composition, which comprises an aqueous dispersion of a mixture of a tetrafluoroethylene/perfluoro (ethylvinylether) copolymer (PFA) having a melt flow rate (MFR) measured under a load of 5 kg and at 372° C. in accordance with ASTM D1238, of 30 to 40 g/10 minutes, and a fluoropolymer containing a reactive functional group comprising a copolymer of tetrafluoroethylene/a phosphate ester compound containing trifluorovinyl ether group/a fluorine-containing comonomer selected from a perfluoro(alkylvinylether) and a perfluoro(alkylvinyl), and an organic titanate, wherein content of titanium contained in the organic titanate, relative to the fluoropolymer component, is 1 to 40% by weight, and wherein the phosphate ester compound containing trifluorovinyl ether group is a dihydrogenphosphate ester compound represented by the following formula (3):

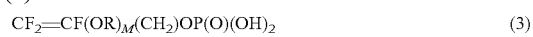

$$CF_2=CF(OR)_M(CH_2)OP(O)(OH)_2 \quad (3)$$

wherein R represents a perfluoroalkyl group or a perfluoroalkoxyl group, having 1 to 20 carbon atoms, and m is an integer of 1 to 10, wherein when m is 2 or more, R is the same or different.

2. The coating composition according to claim 1, wherein the organic titanate is alkoxy titanium, titanium acylate, or titanium chelate which has a structure containing Ti—O—C bond formed by Ti(IV) or Ti(III), and a compound having an alcoholic hydroxyl group, a phenolic hydroxyl group or a carboxyl group.

3. The coating composition according to claim 2, wherein the organic titanate is titanium diisopropoxybis(triethanolaminate).

4. The coating composition according to claim 1, wherein the mixture contains 5 to 99% by weight of the reactive functional group-containing fluoropolymer, relative to the mixture.

5. A method for manufacturing a coated article obtained by coating the coating composition according to claim 1 on a substrate, removing a liquid solvent, and then baking to form a coating film.

6. A coated article manufactured by the method according to claim 5, wherein average thickness of the film formed on the substrate is 1 to 300 μm.

7. A coated article comprising a structure where the film according to claim 6 is a primer layer, and at least one layer of a fluoropolymer or layer mainly comprising the fluoropolymer is formed on said primer, in an average thickness of 2 to 5000 μm.

8. The coated article according to claim 7, wherein a layer containing a fluoropolymer and a polyphenylene sulfide resin is formed, as an intermediate layer, between the primer layer and an outermost layer.

9. The coated article according to claim 6, wherein the substrate is any one of metal, ceramic, stainless steel, glass and heat resistant plastics.

10. The coated article according to claim 7, wherein the substrate is any one of metal, ceramic, stainless steel, glass and heat resistant plastics.

* * * * *